(12) United States Patent
Wadhwa et al.

(10) Patent No.: US 10,642,387 B2
(45) Date of Patent: May 5, 2020

(54) APPARATUS AND METHOD FOR DIGITALLY DRIVING TOUCHSCREEN PANELS WITH TRANSMIT SIGNALS BASED ON PULSE WIDTH MODULATED (PWM) SIGNALS

(71) Applicant: QUALCOMM Incorporated, San Diego, CA (US)

(72) Inventors: Sameer Wadhwa, San Diego, CA (US); James Hendrie McIntyre, San Diego, CA (US); Raghunatha Reddy Sripuram, San Jose, CA (US); Kezhen Liu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 15/933,089

(22) Filed: Mar. 22, 2018

(65) Prior Publication Data
US 2019/0294270 A1 Sep. 26, 2019

(51) Int. Cl.
*G06F 3/044* (2006.01)
*G06F 3/041* (2006.01)

(52) U.S. Cl.
CPC .............. *G06F 3/041* (2013.01); *G06F 3/044* (2013.01); *G06F 3/0416* (2013.01); *G06F 2203/04112* (2013.01)

(58) Field of Classification Search
CPC ........ G06F 3/041; G06F 3/0416; G06F 3/044; G06F 2203/04112
See application file for complete search history.

(56) References Cited

U.S. PATENT DOCUMENTS

| | | | |
|---|---|---|---|
| 8,624,857 B2 | 1/2014 | Cheung et al. | |
| 2002/0058490 A1* | 5/2002 | Sorrells | H03C 1/62 455/313 |
| 2009/0212642 A1 | 8/2009 | Krah | |
| 2010/0164924 A1* | 7/2010 | Seo | G09G 3/3688 345/208 |
| 2011/0127880 A1* | 6/2011 | Murphy | H01L 41/042 310/317 |

(Continued)

OTHER PUBLICATIONS

International Search Report and Written Opinion—PCT/US2019/017435—ISA/EPO—dated May 9, 2019.

*Primary Examiner* — Stephen G Sherman
(74) *Attorney, Agent, or Firm* — Loza & Loza, LLP/Qualcomm (57) ABSTRACT

A touchscreen display including a touchscreen panel with a set of spaced-apart electrically-conductive transmit lines and a set of spaced-apart electrically-conductive receive lines extending in orthogonal directions. A set of class-D transmit drivers generate transmit signals applied to the transmit lines based on a driving pulse-width-modulated (PWM) signals, respectively. The PWM signals control the amplitude, phase, and slew rate of the pulses of the transmit signals, respectively. The parameters of the pulses are controlled so that the transmit signals arrive with substantially the same amplitude, phase, and slew rate at each receiver regardless of which transmit driver generated the transmit signal. This allows a single anti-phase signal at each receiver to substantially cancel out the receive signal during no panel load.

27 Claims, 5 Drawing Sheets

(56) References Cited

U.S. PATENT DOCUMENTS

| | | |
|---|---|---|
| 2013/0293310 A1* | 11/2013 | Levesque .............. H03F 1/0227 330/295 |
| 2014/0139480 A1 | 5/2014 | Seo et al. |
| 2015/0054553 A1* | 2/2015 | Odagiri .................. H03F 3/217 327/134 |
| 2015/0317003 A1* | 11/2015 | Pedersen ................ G06F 3/044 345/173 |
| 2016/0188105 A1 | 6/2016 | Kremin et al. |
| 2017/0090629 A1 | 3/2017 | Kim et al. |
| 2017/0090643 A1 | 3/2017 | Kim et al. |
| 2017/0168644 A1 | 6/2017 | Kang et al. |
| 2017/0242534 A1 | 8/2017 | Gray |
| 2018/0061005 A1* | 3/2018 | Costa ...................... G06F 3/041 |

\* cited by examiner

APPARATUS AND METHOD FOR DIGITALLY DRIVING TOUCHSCREEN PANELS WITH TRANSMIT SIGNALS BASED ON PULSE WIDTH MODULATED (PWM) SIGNALS

FIELD

Aspects of the present disclosure relate generally to touchscreen controllers, and in particular, to an apparatus and method for digitally driving touchscreen panels with transmit signals based on pulse width modulated (PWM) signals.

BACKGROUND

A touchscreen panel includes a set of electrically-conductive transmit lines formed on a first transparent layer spaced apart along a first direction (e.g., vertical) and extending along a second direction (e.g., horizontal) orthogonal to the first direction. The touchscreen panel also includes a set of electrically-conductive receive lines formed on a second transparent layer spaced apart along the second direction and extending along the first direction. A mutual capacitance exists between each pair of transmit-receive line at each intersection of the transmit and receive lines.

A set of transmit drivers generate a set of transmit signals applied to the set of transmit lines, respectively. A set of receivers receive a set of receive signals via the set of receive lines, wherein the receive signals are the transmit signals after propagating through the touchscreen panel via the transmit lines and the receive lines.

A finger or pointing object placed on the touchscreen panel affects the mutual capacitance at one or more transmit-receive line intersections. The effect on the mutual capacitance affects one or more of the received signals at the receivers. By determining which signals are affected, the location of the finger or pointing object may be ascertain. A processor, operating under a software program, may receive the detected location of the finger or pointing object, and may performed one or more defined operations based on such detection.

This disclosure relates to improvements to the set of transmit drivers for generating the set of transmit signals.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus including a touchscreen panel with a set of transmit electrical-conductive lines and a set of receive electrical-conductive lines; a set of transmit drivers configured to generate a set of transmit signals based on a set of pulse width modulated (PWM) signals, respectively; and a set of receivers configured to receive a set of receive signals via the set of transmit lines and the set of receive lines, wherein the set of receive signals are based on the set of transmit signals.

Another aspect of the disclosure relates to a method including generating a set of transmit signals based on a set of pulse width modulated (PWM) signals, respectively; applying the set of transmit signals to a set of transmit electrical-conductive lines of a touchscreen panel, respectively; and receiving a set of receive signals via the set of transmit lines and a set of receive lines, wherein the set of receive signals are based on the set of transmit signals.

Another aspect of the disclosure relates to apparatus including means for generating a set of transmit signals based on a set of pulse width modulated (PWM) signals, respectively; means for applying the set of transmit signals to a set of transmit electrical-conductive lines of a touchscreen panel, respectively; and means for receiving a set of receive signals via the set of transmit lines and a set of receive lines, wherein the set of receive signals are based on the set of transmit signals.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
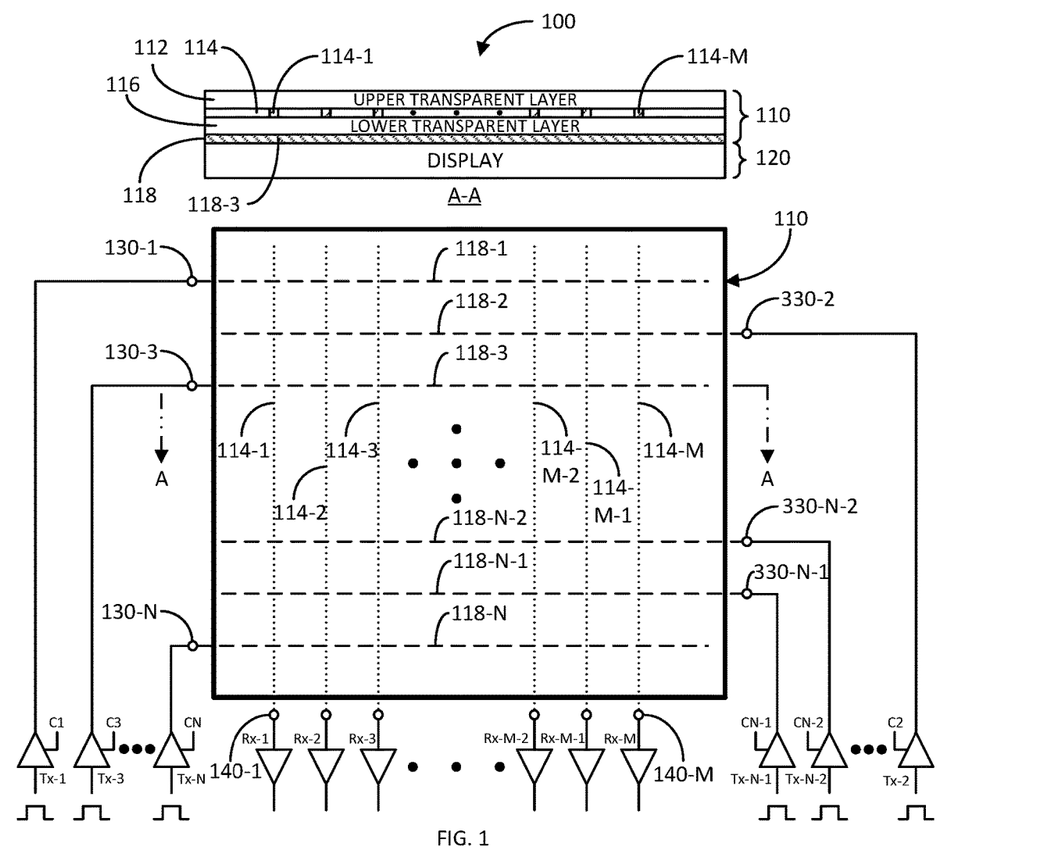
FIG. 1 illustrates a diagram of an exemplary touchscreen display in accordance with an aspect of the disclosure.

FIG. 1 illustrates a diagram of an exemplary touchscreen display 100 in accordance with an aspect of the disclosure. The touchscreen display 100 includes a touchscreen panel 110 disposed over a display 120, as illustrated in cross-sectional view A-A. The display 120 provides an image or video to a user, who may be positioned above in view A-A or in front of the drawing sheet in the non-cross-sectional view. The touchscreen panel 110 provides an indication (if any) of a location of a finger or pointing object (e.g., stylist) that may be placed on the panel.

As seen in cross-sectional view A-A, the touchscreen panel 110 includes an upper transparent (e.g., glass) layer 112 disposed over a receive line layer 114, which, in turn, is disposed over a lower transparent (e.g., glass) layer 116, which, in turn, is disposed over a transmit line layer 118, which, in turn, is disposed over the display 120. It shall be understood that the touchscreen panel 110 is merely an example and may be configured to include layers.

The transmit line layer 118 includes a set of horizontal, electrically-conductive transmit lines 118-1 to 118-N, which are uniformly spaced-apart along a vertical dimension of the touchscreen panel 110. The electrical-conductive transmit lines 118-1 to 118-N may include indium-tin-oxide to give them light transparency properties.

Similarly, the receive line layer 114 includes a set of vertical electrically-conductive receive lines 114-1 to 114-M, which are uniformly spaced-apart along a horizontal dimension of the touchscreen panel 110. The electrical-conductive receive lines 114-1 to 114-M may also include indium-tin-oxide to give them light transparency properties.

The touchscreen display 100 further includes a set of transmit drivers Tx-1 to Tx-N configured to generate a set of signals applied to the transmit lines 118-1 to 118-N of the touchscreen panel 110 via a set of electrodes 130-1 to 130-N, respectively. Additionally, the touchscreen display 100 includes a set of receivers Rx-1 to Rx-M configured to receive the set of signals transmitted by the set of transmit drivers Tx-1 to Tx-N via the set of receive lines 114-1 to 114-M and a set of electrodes 140-1 to 140-M, respectively. The receive lines 114-1 to 114-M are capacitively coupled to the transmit lines 118-1 to 118-N; allowing the set of signals to be routed from the transmit drivers Tx-1 to Tx-N to the receivers Rx-1 to Rx-M.

In operation, the transmit drivers Tx-1 to Tx-N may transmit the set of signals in a time-multiplexed or code-division multiplexed or frequency multiplexed manner Each of the receivers Rx-1 to Rx-M receives the set of signals from the transmit drivers Tx-1 to Tx-N via the transmit lines 118-1 to 118-N and the receive lines 114-1 to 114-M. When a finger or object is placed on the touchscreen panel 110, the signal received by one or more receivers may be altered due to capacitive (electrostatic) interference of the finger or object. A controller (not shown) receives the signals outputted by the receivers Rx-1 to Rx-M, and is able to determine the location of the finger or object based on the received signals.

When there is no finger or object on the touchscreen panel 110 (e.g., no panel load), it is desirable that the signals received by the receivers Rx-1 to Rx-M be substantially the same in terms of amplitude, phase, and skew rate. As discussed further, this is because each receiver also receives an anti-phase signal, which is combined with the signal received from the panel 110 to cause the receiver to output a mid-range voltage (e.g., substantially zero (0) Volt if the dynamic range of the output swings between V+ and V−) when there is no finger or object detected by the receiver. This provides a desirable dynamic range for the receiver to better detect the signal when altered by a finger or object on the panel, as well as handle any jammer (e.g., unwanted signal and/or noise) that may be received.

Figure 2:
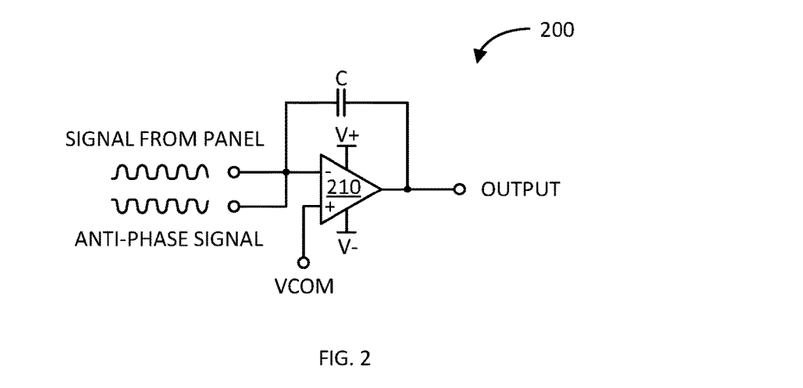
FIG. 2 illustrates a schematic diagram of an exemplary receiver in accordance with another aspect of the disclosure.

FIG. 2 illustrates a schematic diagram of an exemplary receiver 200 in accordance with another aspect of the disclosure. The receiver 200 may be an exemplary implementation of any of the receiver Rx-1 to Rx-M previously discussed. The receiver 200 may be configured to include an integrator including an operational amplifier 210 and a feedback capacitor C. The feedback capacitor C is coupled between a negative input and an output of the operational amplifier 210. The negative input of the operational amplifier 210 is configured to receive the signal from the touchscreen panel 110 and an anti-phase signal. The operational amplifier 210 includes a positive input configured to receive a voltage for setting a common mode voltage of an output signal of the operational amplifier 210.

The anti-phase signal is configured to have substantially the same amplitude and phase of the signal received from the touchscreen panel 210 when there is no finger or object on the panel (e.g., no panel load). As a result, the no-load panel signal and the anti-phase signal substantially cancel out at the input of the operational amplifier 210. Thus, when there is no load on the panel 110, the operational amplifier 210 generates substantially a mid-range voltage, which could be substantially zero (0) Volt if the operational amplifier is supplied with positive/negative equal voltages V+ and V−. As stated above, this provides the fully dynamic range of the output of the operational amplifier 210 to deal with a load presented to the panel 110 as well as a jammer introduced via the panel.

Referring again to FIG. 1, if the signals transmitted by the transmit drivers Tx-1 and Tx-N are the same, then the signals received by the receivers Rx-1 to Rx-M are not the same. This is because the touchscreen panel 110 presents a different circuit to each of the transmit drivers. For example, the transmit driver Tx-1 sees a longer transmission path to the receiver Rx-1 (almost the entire vertical length of the panel) than that transmission path seen by transmit driver Tx-N (a small portion (near the bottom) of the entire vertical length of the panel). Thus, each transmit driver sees a different equivalent circuit to each of the receivers. If the no-load panel signal is not the same at the receiver for all transmit drivers, then the anti-phase signal is not able to cancel the no-load signals for all transmit drivers Tx-1 to Tx-N.

Figure 3A:
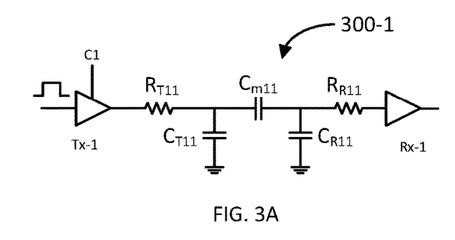
FIG. 3A illustrates a schematic diagram of an exemplary equivalent circuit between the transmit driver Tx-1 and the receiver Rx-1 in accordance with another aspect of the disclosure.

FIG. 3A illustrates a schematic diagram of an exemplary equivalent circuit 300-1 between the transmit driver Tx-1 and the receiver Rx-1. The equivalent circuit 300-1 includes a series resistor $R_{T11}$ related to the resistance between the transmit driver Tx-1 and the intersection of the transmit line 118-1 and the receive line 114; a shunt capacitor $C_{T11}$ related to the shunt capacitance between the transmit driver Tx-1 and the intersection of the transmit line 118-1 and the receive line 114-1; a series capacitor $C_{m11}$ related to the mutual capacitance between the transmit line 118-1 and the receive line 114-1 at their intersection; a shunt capacitor $C_{R11}$ related to the shunt capacitance between the intersection of the transmit line 118-1 and the receive line 114-1, and the receiver Rx-1; and a series resistor $R_{R11}$ related to the resistance between the intersection of the transmit line 118-1 and the receive line 114-1, and the receiver Rx-1.

Figure 3B:
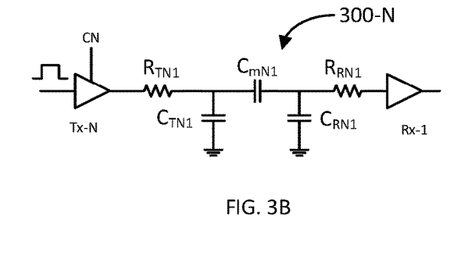
FIG. 3B illustrates a schematic diagram of an exemplary equivalent circuit between the transmit driver Tx-N and the receiver Rx-1 in accordance with another aspect of the disclosure.

FIG. 3B illustrates a schematic diagram of another exemplary equivalent circuit 300-N between the transmit driver Tx-N and the receiver Rx-1. The equivalent circuit 300-N includes a series resistor $R_{TN1}$ related to the resistance between the transmit driver Tx-N and the intersection of the transmit line 118-N and the receive line 114-1; a shunt capacitor $C_{TN1}$ related to the shunt capacitance between the transmit driver Tx-N and the intersection of the transmit line 118-N and the receive line 114-1; a series capacitor $C_{mN1}$ related to the mutual capacitance between the transmit line 118-N and the receive line 114-1 at their intersection; a shunt capacitor $C_{RN1}$ related to the shunt capacitance between the intersection of the transmit line 118-N and the receive line 114-1, and the receiver Rx-1; and a series resistor $R_{RN1}$ related to the resistance between the intersection of the transmit line 118-N and the receive line 114-1, and the receiver Rx-1.

As the length of the receive line 114-1 is longer between transmit driver Tx-1 and receiver Rx-1 than it is between transmit Tx-N and receiver Rx-1, the resistance of resistor $R_{R11}$ and capacitance of capacitor $C_{R11}$ of equivalent circuit 300-1 are greater than the resistance of resistor $R_{RN1}$ and capacitance of capacitor $C_{RN1}$ of equivalent circuit 300-N. As a consequence, the equivalent circuit 300-1 presented to the transmit driver Tx-1 has a low pass filter response with a cutoff frequency less than a cutoff frequency of a low pass filter response presented to the transmit driver Tx-N by equivalent circuit 300-N. Thus, equivalent circuit 300-1 has a greater adverse effect on the signal received by the receiver RX-1 than the corresponding effect of equivalent circuit 300-N.

Figure 3C:
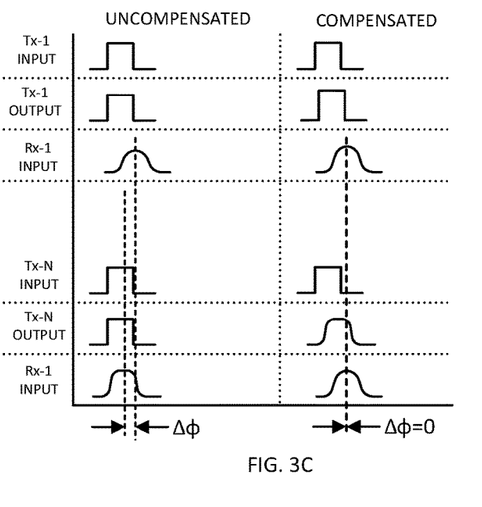
FIG. 3C illustrates a signal diagram of exemplary input signals to transmit drivers Tx-1 and Tx-N, output signals of transmit drivers Tx-1 and Tx-N, and receive signals by receiver Rx-1 for uncompensated and compensated transmit signals in accordance with another aspect of the disclosure.

FIG. 3C illustrates a signal diagram of exemplary input signals to transmit drivers Tx-1 and Tx-N, output signals of transmit drivers Tx-1 and Tx-N, and receive signals by receiver Rx-1 for uncompensated and compensated transmit signals in accordance with another aspect of the disclosure. The left column of the signal diagram shows the aforementioned signals for the case where the transmit signals are not compensated for the different equivalent circuits presented to transmit drivers Tx-1 and Tx-N (e.g., all transmit signals are substantially the same). The right column of the signal diagram shows the aforementioned signals for the case where the transmit signals are compensated for the different equivalent circuits presented to transmit drivers Tx-1 and Tx-N.

In the uncompensated case, the transmit signal generated by the transmit driver Tx-1 is substantially the same in terms of amplitude, phase, and skew as the transmit signal generated by transmit driver Tx-N. Because the transmit driver Tx-1 sees an equivalent panel circuit 300-1 that has a lower cutoff frequency and more losses, the receive signal at the input of the receiver Rx-1 is more distorted (e.g., lower amplitude, higher phase shift ($\Delta\Phi$), and lower slew rate) than the receive signal at the input of the receiver Rx-1 resulting from the transmission of the transmit driver Tx-N.

In order to compensate for the two distinct equivalent circuits 300-1 and 300-N seen by the transmit drivers Tx-1 and Tx-N (as well as those seen by the other transmit drivers Tx-2 to Tx-N-1), the amplitude, phase, and slew rate of the signals transmitted by the transmit drivers Tx-1 to Tx-N are adjusted so that the signals at the inputs of the receivers Rx-1 to Rx-M are substantially the same regardless of which transmit driver transmitted the signal. This is exemplified in the compensated right portion of the signal diagram. For instance, the transmit signal of transmit driver Tx-1 has a waveform that resembles a square wave (has sharper edges or higher slew rate) more than a waveform of the transmit signal of transmit driver Tx-N. As a result of this compensation, the amplitude, phase, and slew rate of the signals substantially equalize at the input of the receiver Rx-1. Again, as discussed above, this allows the anti-phase signal to cancel out all no-load signals received at the receiver input regardless of which transmit driver transmitted the signal.

In some designs, the transmit drivers Tx-1 and Tx-N are configured as analog transmitters with associated analog circuitry for adjusting the amplitude, phase, and slew rate of their corresponding transmit signals. Such analog transmitters are costly in terms of integrated circuit (IC) footprint and power consumption. To save IC footprint and power, often a subset of the transmit drivers are controlled in the same manner. For example, a first group of transmit drivers Tx-1 to Tx-4 may be controlled to output substantially the same transmit signals, with the understanding that the corresponding signals at a receiver may be not be substantially the same. Similarly, another group of transmit drivers Tx-1 to Tx-4 may be controlled to output substantially the same transmit signals, but different or compensated with respect to the transmit signal of the first group. Thus, there is a tradeoff between per channel control or group control versus IC footprint and power consumption. Such tradeoff may not always be desirable.

In summary, a concept of the disclosure is to employ a more digital approach to a set of transmit drivers Tx-1 to Tx-N of a touchscreen display. The approach is to configure the transmit drivers as class-D amplifiers, e.g., they are either fully turned on or fully turned off; and optionally, may include an intermediate state (e.g., ½ of VDD). The class-D transmit drivers are driven by a pulse-width-modulated (PWM) signal for controlling their respective transmit signals to achieve a desired set of signals at the inputs of a set of receivers, respectively. For example, such desired set of signals at the receivers being substantially the same in amplitude, phase, and slew rate at no-panel load condition, so that the anti-phase signal is able to substantially cancel out the received panel signal for all signals transmitted by transmit drivers Tx-1 to Tx-N.

The more digital approach allows for a smaller IC footprint to implement the transmit drivers Tx-1 to Tx-N. Furthermore, because the transmit drivers Tx-1 to Tx-N are implemented as class-D amplifiers, the power efficiency is significantly higher compared to that of the more analog transmit driver approach. This facilitates a lower power consumption solution. Moreover, because of the benefits of providing a smaller IC footprint and lower power consumption, each of the transmit drivers or channels may be optimized individually; that is, the amplitude, phase, and slew rate may be separately controlled for each transmit driver.

Figure 4:
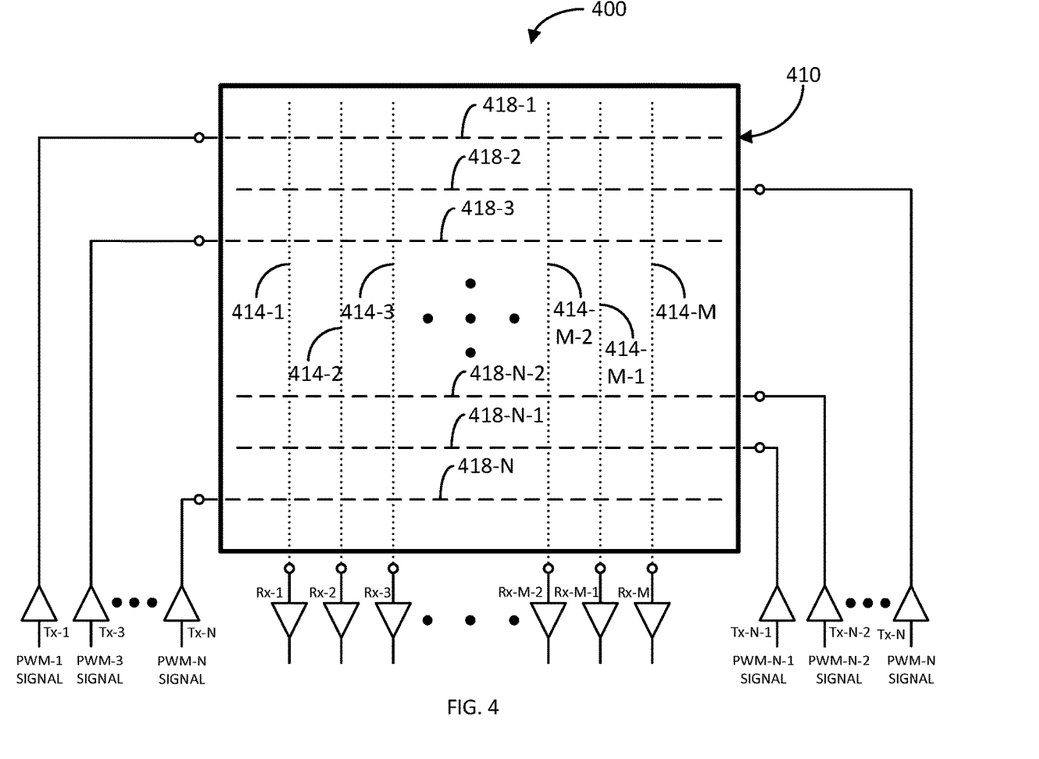
FIG. 4 illustrates a diagram of an exemplary touchscreen display in accordance with another aspect of the disclosure.

FIG. 4 illustrates a diagram of an exemplary touchscreen display 400 in accordance with another aspect of the disclosure. The touchscreen display 400 is similar to that of touchscreen display 100, including a touchscreen panel 410 with a set of electrically-conductive transmit lines 418-1 to 418-N and a set of electrically-conductive receive lines 414-1 to 414-M, and a set of receivers Rx-1 to Rx-M. The touchscreen display 400 differs from touchscreen display 100 in that it includes a set of transmit drivers Tx-1 to Tx-N configured as class-D amplifiers and driven by a set of distinct pulse width modulated (PWM) signals PWM-1 to PWM-N, respectively. Each of the PWM signal may be configured to cause the corresponding transmit driver to generate a desired transmit signal having the desired amplitude, phase, and slew rate. This is exemplified below with reference to the following examples.

Figure 5A:
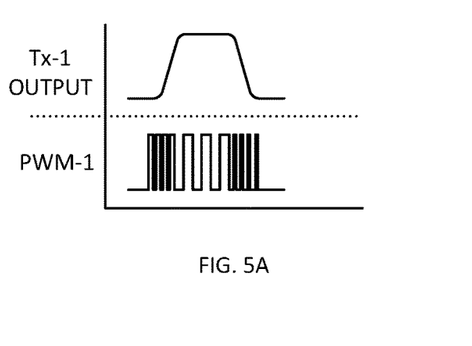
FIG. 5A illustrates a graph of an exemplary pulse width modulated (PWM) signal and a corresponding transmit signal in accordance with another aspect of the disclosure.

FIG. 5A illustrates a graph of an exemplary pulse width modulated (PWM) signal and a corresponding transmit signal in accordance with another aspect of the disclosure. In this example, the illustrated signal is PWM-1 for driving class-D transmit driver Tx-1. As previously discussed, as the transmit driver Tx-1 sees the harshest equivalent circuit, the PWM-1 signal is configured to drive the transmit driver Tx-1 to produce a transmit signal with relatively high slew rate.

In this regard, the PWM-1 signal includes an early region including a relatively high pulse density and a duty cycle configured to favor Vdd as compared to Vss to produce a relatively steep rising edge for transmit driver Tx-1 output signal. The PWM-1 signal includes a middle region with a lower pulse density and a duty cycle that neither favors Vdd nor Vss to achieve a steady-state or substantially constant amplitude for the transmit driver Tx-1 output signal. The PWM-1 signal further includes a late region including a relatively high pulse density and a duty cycle configured to favor Vss as compared to Vdd to produce a relatively steep falling edge for the transmit driver Tx-1 output signal.

The phase of the transmit signal generated by transmit driver Tx-1 may be controlled by when the PWM-1 causes the transmit driver Tx-1 to begin generating the rising edge of the transmit signal. The amplitude of the transmit signal may also be controlled by the density of the pulses and the duty cycle. However, all the transmit drivers Tx-1 to Tx-N may be driven with the corresponding PWM signals such that a maximum amplitude is achieved when the panel capacitance is fully charged.

Figure 5B:
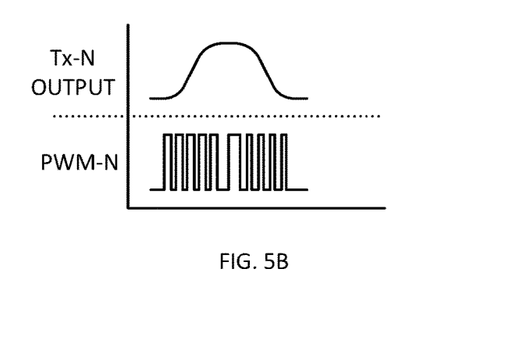
FIG. 5B illustrates a graph of another exemplary pulse width modulated (PWM) signal and a corresponding transmit signal in accordance with another aspect of the disclosure.

FIG. 5B illustrates a graph of another exemplary pulse width modulated (PWM) signal and a corresponding transmit signal. In this example, the illustrated signal is PWM-N for driving class-D transmit driver Tx-N. As previously discussed, as the transmit driver Tx-N sees the least harsh equivalent circuit, the PWM-N signal is configured to drive the transmit driver Tx-N to produce a transmit signal with a relatively low slew rate.

In a similar manner, the PWM-N signal includes an early region including a relatively low pulse density and a duty cycle configured to favor Vdd as compared to Vss to produce a more gradual rising edge for transmit driver Tx-N output signal. The PWM-N signal includes a middle region with a lower pulse density and a duty cycle to neither favor Vdd nor Vss to achieve a steady-state or substantially constant amplitude for the transmit driver Tx-N output signal. The PWM-N signal further includes a late region including a relatively low pulse density and a duty cycle configured to favor Vss as compared to Vdd to produce a more gradual falling edge for the transmit driver Tx-N output signal.

The transmit signals generated by the other transmit drivers Tx-2 to Tx-N-1 may be driven by corresponding PWM-2 to PWM-N-1 signals to achieve the desired set of transmit signals. As an example, the set of PWM signals PWM-2 to PWM-N-1 may be configured to monotonically or gradually decrease the slew rates of the transmit signals generated by transmit drivers Tx-2 to Tx-N-1, respectively.

Figure 6:
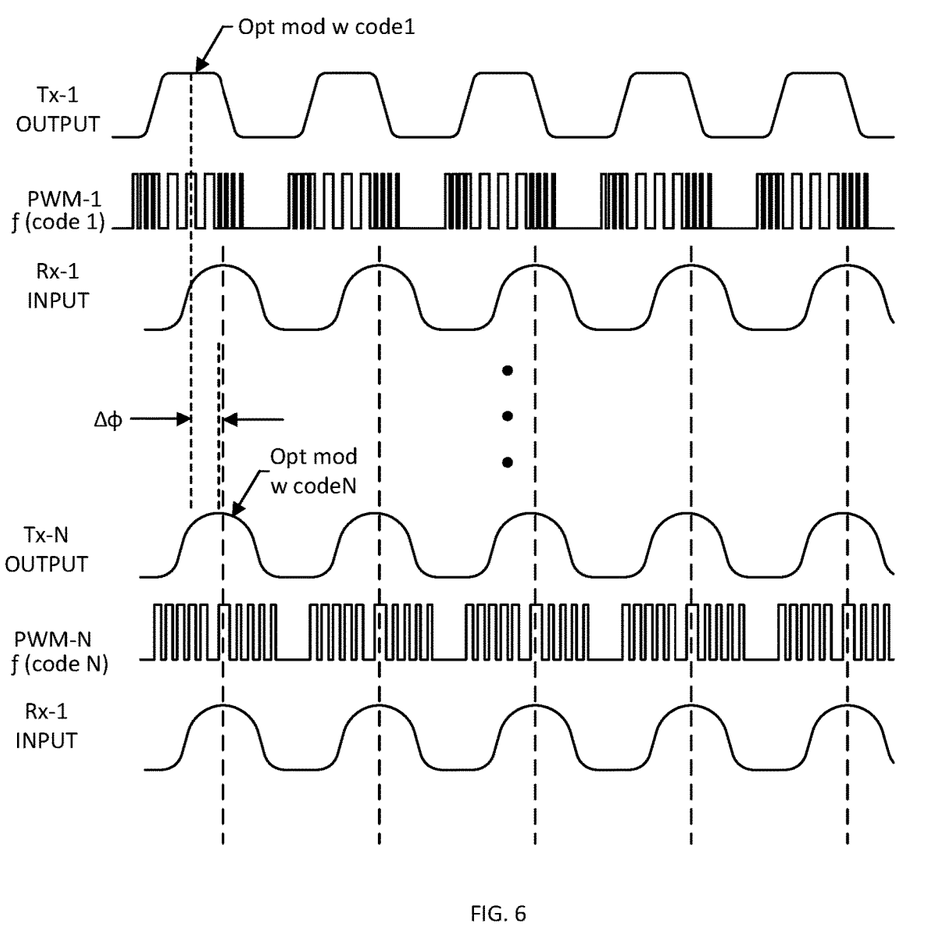
FIG. 6 illustrates a timing diagram of an exemplary set of transmit, pulse width modulated, and receive signals in accordance with another aspect of the disclosure.

FIG. 6 illustrates a timing diagram of an exemplary set of transmit, pulse width modulated, and receive signals associated with transmit drivers Tx-1 to Tx-N in accordance with another aspect of the disclosure. The transmit signals of the transmit drivers Tx-1 to Tx-N may be configured to include substantially periodic pulses (e.g., transmitted at a substantially constant frequency). The corresponding pulse width modulated signal PWM-1 driving the transmit driver Tx-1 includes sets of periodic PWM pulses, each set configured to produce the desired amplitude, phase and slew rate of each pulse of the transmit signal. Thus, it follows that the sets of PWM pulses of PWM-1 signal are periodic and substantially phase aligned with the pulses of the transmit signal generated by transmit driver Tx-1. Note that for each pulse of the transmit signal there are multiple periods of the pulses of the PWM signal.

Also shown in connection with the PWM-1 signal and the transmit signal generated by transmit driver Tx-1 is the receive signal at the input of receiver Rx-1. Although, in this example, the receiver Rx-1 serves as the destination for the transmit signals generated by transmit drivers Tx-1 to Tx-N, it shall be understood that the same principles apply for the corresponding signals at the input of the other receivers Rx-2 to Rx-M (although the signals at the inputs of the receivers Rx-2 to Rx-M experience larger phase shifts as their propagation paths are longer). In this example, the signal at the input of receiver Rx-1 includes a periodic set of pulses, wherein each of the pulses has been distorted by the touchscreen panel 410 (e.g., lower amplitude, lower slew rate, and a phase shift of $\Delta\Phi$ with respect to the transmit signal).

Similar, the transmit signal generated by transmit driver Tx-N includes substantially periodic pulses (e.g., transmitted at substantially constant frequency). The corresponding pulse width modulated signal PWM-N driving the transmit driver Tx-N includes a set of periodic PWM pulses, each driven to produce the desired amplitude, phase and slew rate of each pulse of the transmit signal. Thus, it follows that the sets of PWM pulses of PWM-N signal are periodic and substantially phase aligned with the pulses of the transmit signal generated by transmit driver Tx-N. Note that for each pulse of the transmit signal, there are multiple periods of the pulses of the PWM signal. Further, the corresponding signal at the input of receiver Rx-1 includes a periodic set of pulses, where each of the pulses has been distorted by the touchscreen panel 410 (e.g., lower amplitude, lower slew rate, and substantially the same phase shift of $\Delta\Phi$ with respect to the transmit signal generated by Tx-1).

As a result, the signal at the input of the receiver Rx-1 resulting from the transmission by the transmit driver Tx-1 is substantially in phase with the signal at the input of the receiver Rx-1 resulting from the transmission by the transmit driver Tx-N (as well as the received signal corresponding to the other transmit drivers Tx-2 to Tx-N-1). Again, this allows the anti-phase signal at the receiver Rx-1 to substantially cancel out the received signal regardless of which transmit driver transmitted the signal. As stated above, this applies to the respective signals received by the other receivers Rx-2 to Rx-M, as these received signals are substantially in phase with the anti-phase signals at the receivers Rx-2 to Rx-M regardless of which transmit driver transmitted the signal.

The transmit signals may be transmitted by the transmit drivers Tx-1 to Tx-N in a time-multiplexed manner. For example, during a first time interval $\Delta t_1$, transmit driver Tx-1 transmits a transmit signal, and the other transmit drivers Tx-2 to Tx-N do not transmit a signal (e.g., transmit drivers Tx-2 to Tx-N may be tri-stated). During a second time interval $\Delta t_2$, transmit driver Tx-2 transmits a transmit signals, and the other transmit drivers Tx-1 and Tx-3 to Tx-N do not transmit a signal (e.g., transmit drivers Tx-1 and Tx-3 to Tx-N may be tri-stated). This time-division transmission process continues until transmit driver Tx-N transmits its transmit signal, and the process may be repeated in a round-robin or other manners (e.g., the transmission of the transmit signals of Tx-1 to Tx-N need not be performed in a sequential manner as discussed above).

Alternatively, the transmit drivers Tx-1 to Tx-N may be configured to simultaneous generate the transmit signals. For the receivers Rx-1 to Rx-M to distinguish the signals transmitted by the transmit drivers, the transmit signals may be modulated with a set of orthogonal codes or frequencies, respectively. For example, as illustrated in FIG. 6, the transmit signals generated by transmit drivers Tx-1 to Tx-N may be modulated with orthogonal codes 1 to N. One technique to effectuate the code modulation of the transmit signals is for the corresponding pulse width modulated to vary with the corresponding code. Thus, as illustrated, the PWM-1 to PWM-N signals for driving transmit drivers Tx-1 to Tx-N vary as a function of orthogonal codes 1 to N, respectively.

Figure 7:
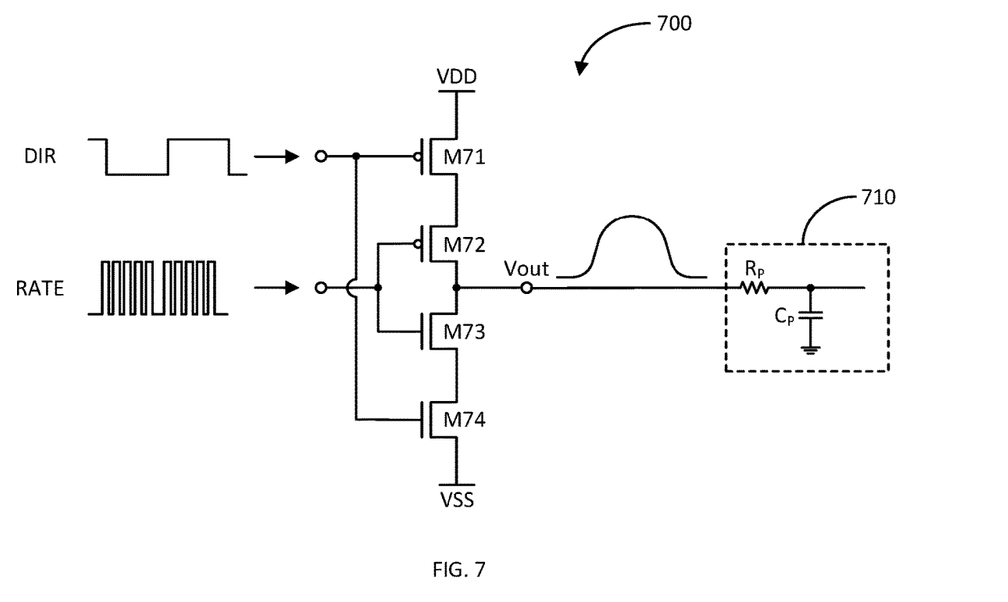
FIG. 7 illustrates a schematic of an exemplary class-D amplifier in accordance with another aspect of the disclosure.

FIG. 7 illustrates a schematic of an exemplary class-D amplifier 700 in accordance with another aspect of the disclosure. The class-D amplifier 700 may be an exemplary detailed implementation any of the transmit drivers Tx-1 to Tx-N previously discussed. The class-D amplifier 700 includes transistors M71, M72, M73, and M74 coupled in series between an upper voltage rail VDD and a lower voltage rail VSS (e.g., ground). The transistors M71, M72, M73, and M74 may each be configured as a metal oxide semiconductor field effect transistor (MOSFET), where transistors M71 and M72 include a p-channel and transistors M73 and M74 include an n-channel.

The transistors M71 and M74 include gates configured to receive a direction signal for controlling a direction to move an output Vout. For example, if the direction signal is at a logic low level, the output voltage Vout is moved in a positive voltage direction. If the direction signal is at a logic high level, the output voltage Vout is moved in a negative voltage direction.

The transistors M72 and M73 include gates coupled together and configured to receive a rate signal for controlling the slew rate at the output voltage Vout. The rate signal includes a set of pulses, wherein the rate at which the output voltage is moved is related or proportional to the duty cycle of the pulses. The duty cycles could either be fixed or vary with time with a first order or a higher order gradient. The combination of the direction signal and the rate signal constitute the PWM signal driving the class-D amplifier. As previously discussed, the PWM signal may be configured to cause the class-D amplifier to generate the output voltage to include a set of pulses, which may be repetitive, time-multiplexed based on a code, or arranged in other manners. The PWM could also be noise shaped to reduce the in-band component.

The class-D amplifier 700 includes an output node between the respective drains of transistors M72 and M73. The output node is coupled to a transmit line of a touchscreen panel as previously discussed. In this example, the touchscreen panel presents an RC equivalent circuit 710 to the output of the class-D amplifier 700, including a series resistor $R_P$ and a shunt capacitor $C_P$. The operation of the class-D amplifier 700 produces the charging and discharging of the shunt capacitor $C_P$ to generate the output voltage Vout as previously discussed.

In operation, during a time interval when the direction signal is low, transistor M71 is turned on and transistor M74 is turned off. When the slew rate signal is at a low logic level during this time interval, transistor M72 is turned on and transistor M73 is turned off. As transistors M71 and M72 are both turned on and transistors M73 and M74 are turned off, the upper voltage rail VDD is coupled to the output node of the class-D amplifier 700, while the lower voltage rail VSS is isolated from the output node. This produces a charging of the panel capacitor $C_P$ to produce a rise in the output voltage Vout.

If, on the other hand, the rate signal is at a high logic level, transistor M72 is turned off and transistor M73 is turned on. Because both transistors M72 and M74 are turned off, they isolate the output node of the class-D amplifier 700 from both the upper voltage rail VDD and the lower voltage rail VSS. Thus, the class-D amplifier 700 is tri-stated. This prevents or halts the charging of the panel capacitor $C_P$. By controlling the amount of time at which the class-D amplifier 700 couples the upper voltage rail VDD to the output as compared to the amount of time at which the class-D amplifier is tri-stated (e.g., controlling the duty cycle of the rate signal), the slew rate at which the output voltage Vout rises may be controlled.

During a time interval when the direction signal is high, transistor M71 is turned off and transistor M74 is turned on. When the slew rate signal is at a high logic level during this time interval, transistor M72 is turned off and transistor M73 is turned on. As transistors M73 and M74 are both turned on and transistors M71 and M72 are turned off, the lower voltage rail VSS is coupled to the output node of the class-D amplifier 700, while the upper voltage rail VDD is isolated from the output node. This produces a discharging of the panel capacitor $C_P$ to produce a fall in the output voltage Vout.

If, on the other hand, the slew rate signal is at a low logic level, transistor M72 is turned on and transistor M73 is turned off. Because both transistors M71 and M73 are turned off, they isolate the output of the class-D amplifier 700 from both the upper voltage rail VDD and the lower voltage rail VSS. Thus, the class-D amplifier 700 is tri-stated. This prevents or halts the discharging of the panel capacitor $C_P$. By controlling the amount of time at which the class-D amplifier 700 couples the lower voltage rail VSS to the output as compared to the amount of time at which the class-D amplifier is tri-stated (e.g., controlling the duty cycle of the rate signal), the slew rate at which the output voltage falls may be controlled.

Figure 8:
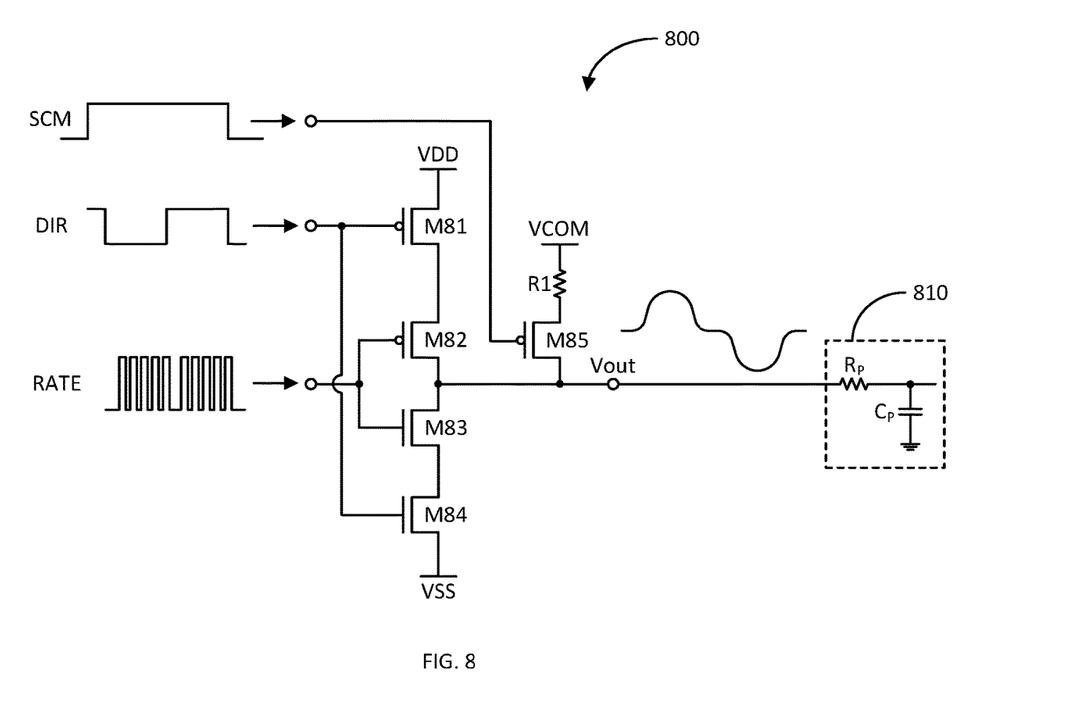
FIG. 8 illustrates a schematic of another exemplary class-D amplifier in accordance with another aspect of the disclosure.

FIG. 8 illustrates a schematic of another exemplary class-D amplifier 800 in accordance with another aspect of the disclosure. The class-D amplifier 800 is similar to that of class-D amplifier 800, but further includes circuitry for setting a common mode voltage of the output voltage Vout of the class-D amplifier 800.

In particular, the class-D amplifier 800 includes transistors M81, M82, M83, and M84 coupled in series between an upper voltage rail VDD and a lower voltage rail VSS. The transistors M81 and M82 are p-channel MOSFETs and transistors M83 and M84 are n-channel MOSFETs. The transistors M81 and M84 include gates configured to receive a direction signal. The transistors M82 and M83 are configured to receive a slew rate signal. The class-D amplifier 800 includes an output node between the drains of transistors M82 and M83, wherein the output node is coupled to a touchscreen panel as represented by an RC equivalent circuit 810 including series resistor $R_P$ and shunt capacitor $C_P$. The operation of the transistors M81, M82, M83, and M84 being driven by the direction and rate signals to generate an output voltage Vout is substantially the same as described with reference to class-D amplifier 800.

The class-D amplifier 800 further includes a circuit for setting a common mode voltage VCOM of the output voltage Vout. The circuit includes a resistor R1 and a transistor M85 coupled in series between a source of a common mode voltage VCOM and the output node of the class-D amplifier 800. The transistor M85 may be configured as a p-channel MOSFET. The transistor M85 includes a gate configured to receive a set-common-mode (SCM) signal.

In operation, when the SCM signal is at a low logic level, the transistor M85 turns on to couple the source of the common mode voltage VCOM to the output node; and thus, precharge the panel capacitor $C_P$ to the desired common mode voltage VCOM. This is typically performed before the formation of at least one pulse. Then, during the formation of the at least one pulse, the SCM signal is set to a high logic level to turn off transistor M85 and disable the common mode voltage setting circuit. This circuit may be enabled as required to maintain the common mode voltage of the output voltage at a desired level.

Figure 9:
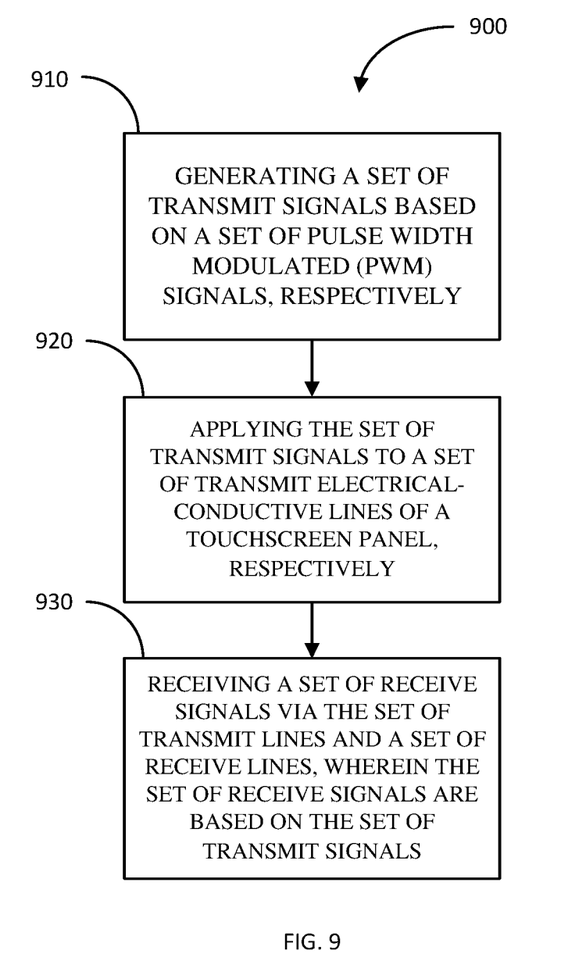
FIG. 9 illustrates a flow diagram of an exemplary method of operating a touchscreen display in accordance with another aspect of the disclosure.

FIG. 9 illustrates a flow diagram of an exemplary method 900 of operating a touchscreen panel in accordance with another aspect of the disclosure.

The method 900 includes generating a set of transmit signals based on a set of pulse width modulated (PWM) signals, respectively (block 910). An example of a means for generating a set of transmit signals based on a set of pulse width modulated (PWM) signals, respectively, include the transmit drivers Tx-1 to Tx-N previously discussed.

The method 900 further includes applying the set of transmit signals to a set of transmit electrical-conductive lines of a touchscreen panel, respectively (block 920). An example of means for applying the set of transmit signals to a set of transmit electrical-conductive lines of a touchscreen panel, respectively, include the electrical connection between the transmit drivers Tx-1 to Tx-N and the transmit electrical-conductive lines 418-1 to 418-N, respectively.

Additionally, the method 900 includes receiving a set of receive signals via the set of transmit lines and a set of receive lines, wherein the set of receive signals are based on the set of transmit signals (block 930). An example of means for receiving a set of receive signals via the set of transmit lines and a set of receive lines, wherein the set of receive signals are based on the set of transmit signals include the receivers Rx-1 to Rx-M previously discussed.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
   a touchscreen panel comprising:
      a set of transmit lines; and
      a set of receive lines;
   a set of transmit drivers configured to generate a set of transmit signals based on a set of pulse width modulated (PWM) signals, respectively, wherein the set of transmit drivers are configured to generate corresponding transmit signals so as to include a set of pulses, wherein each pulse of the set of pulses is based on a distinct set of PWM pulses; and
   a set of receivers configured to receive a set of receive signals via the set of transmit lines and the set of receive lines, wherein the set of receive signals are based on the set of transmit signals;
   wherein the set of transmit drivers are configured to generate the set of transmit signals based on distinct equivalent circuits presented to the set of transmit drivers by the touchscreen panel, such that the set of receive signals are substantially the same in amplitude, phase, and slew rate when there is no load on the touchscreen panel.

2. The apparatus of claim 1, wherein the transmit driver is configured to generate each pulse of the set of pulses with a slew rate based on the set of PWM pulses.

3. The apparatus of claim 1, wherein the transmit driver is configured to generate each pulse of the set of pulses with an amplitude based on the set of PWM pulses.

4. The apparatus of claim 1, wherein the transmit driver is configured to generate each pulse of the set of pulses with a phase based on the set of PWM pulses.

5. The apparatus of claim 1, wherein the set of pulses comprises a set of pulses transmitted at a substantially constant frequency.

6. The apparatus of claim 1, wherein each pulse of the set of pulses is modulated with a code or frequency identifying the corresponding transmit driver that transmitted the set of pulses.

7. The apparatus of claim 1, wherein each of the transmit drivers comprises a class-D amplifier.

8. The apparatus of claim 1, wherein each of the transmit drivers comprises:
   a first field effect transistor (FET);
   a second FET;
   a third FET; and
   a fourth FET coupled in series with the first, second, and third FETs between an upper voltage rail and a lower voltage rail, wherein the corresponding PWM signal includes a direction signal and a rate signal, wherein gates of the first and fourth FETs are configured to receive the direction signal, wherein gates of the second and third FETs are configured to receive the rate signal, and wherein the corresponding transmit signal is produced at an output node between the second and third FETs.

9. The apparatus of claim 1, wherein each of the transmit driver further comprises:
   a resistor; and
   a fifth FET coupled in series between a source of a common mode voltage and the output node, wherein the fifth FET includes a gate configured to receive a set common mode signal for setting a common mode voltage of the corresponding transmit signal.

10. The apparatus of claim 1, wherein the set of transmit signals include sets of pulses with different slew rates, respectively.

11. The apparatus of claim 1, wherein the set of transmit signals include sets of pulses with different slew rates, respectively, to cause the set of receive signals at each of the receivers to include pulses having substantially the same slew rate regardless of which of the transmit drivers transmitted the transmit signals.

12. A method, comprising:
generating a set of transmit signals based on a set of pulse width modulated (PWM) signals, respectively;
applying the set of transmit signals to a set of transmit lines of a touchscreen panel, respectively, wherein the set of transmit drivers are configured to generate corresponding transmit signals so as to include a set of pulses, wherein each pulse of the set of pulses is based on a distinct set of PWM pulses; and
receiving a set of receive signals via the set of transmit lines and a set of receive lines, wherein the set of receive signals are based on the set of transmit signals, wherein the set of transmit signals are generated based on distinct equivalent circuits presented to the set of transmit drivers by the touchscreen panel, such that the set of receive signals are substantially the same in amplitude, phase, and slew rate when there is no load on the touchscreen panel.

13. The method of claim 12, further comprising configuring the set of PWM pulses to set a slew rate for each pulse of the set of pulses.

14. The method of claim 12, further comprising configuring the set of PWM pulses to set an amplitude for each pulse of the set of pulses.

15. The method of claim 12, further comprising configuring the set of PWM pulses to set a phase of each pulse of the set of pulses is generated.

16. The method of claim 13, wherein generating each of the transmit signal comprises generating the set of pulses such that the pulses are substantially periodic.

17. The method of claim 13, wherein generating each of the transmit signal comprises generating the set of pulses such that each pulse is modulated with a code or frequency identifying the corresponding transmit driver transmitting the set of pulses.

18. The method of claim 13, wherein generating the set of transmit signals comprises generating the set of transmit signals such that the transmit signals include sets of pulses with different slew rates, respectively.

19. The method of claim 13, wherein generating the set of transmit signals comprises generating the set of transmit signals to include sets of pulses with different slew rates, respectively, to cause the set of receive signals at each of the receivers to include pulses having substantially the same slew rate regardless of which of the transmit drivers transmitted the transmit signals.

20. An apparatus, comprising:
means for generating a set of transmit signals based on a set of pulse width modulated (PWM) signals, respectively;
means for applying the set of transmit signals to a set of transmit lines of a touchscreen panel, respectively, wherein the set of transmit drivers are configured to generate corresponding transmit signals so as to include a set of pulses, wherein each pulse of the set of pulses is based on a distinct set of PWM pulses; and
means for receiving a set of receive signals via the set of transmit lines and a set of receive lines, wherein the set of receive signals are based on the set of transmit signals, wherein the set of transmit signals are generated based on distinct equivalent circuits presented to the means for generating the set of transmit signals by the touchscreen panel, such that the set of receive signals are substantially the same in amplitude, phase, and slew rate when there is no load on the touchscreen panel.

21. The apparatus of claim 20, further comprising means for configuring the set of PWM pulses to set a slew rate for each pulse of the set of pulses.

22. The apparatus of claim 20, further comprising means for configuring the set of PWM pulses to set an amplitude for each pulse of the set of pulses.

23. The apparatus of claim 20, further comprising means for configuring the set of PWM pulses to set a phase associated with the set of pulses is generated.

24. The apparatus of claim 20, wherein the means for generating the transmit signals comprises means for generating the set of pulses such that the pulses are substantially periodic.

25. The apparatus of claim 20, wherein the means for generating the transmit signals comprises means for generating the set of pulses based on a code or frequency identifying the corresponding transmit driver transmitting the set of pulses.

26. The apparatus of claim 20, wherein the means for generating the set of transmit signals comprises means for generating the set of transmit signals such that the transmit signals include sets of pulses with different slew rates, respectively.

27. The apparatus of claim 20, wherein the means for generating the set of transmit signals comprises means for generating the set of transmit signals to include sets of pulses with different slew rates, respectively, to cause the set of receive signals at each of the receivers to include pulses having substantially the same slew rate regardless of which of the transmit drivers transmitted the transmit signals.

* * * * *